(12) United States Patent
Lin-Hendel

(10) Patent No.: US 9,405,852 B2
(45) Date of Patent: *Aug. 2, 2016

(54) AUTOMATED CHANGING OF CONTENT SET DISPLAYING IN THE DISPLAY SCREEN OF A BROWSER AND AUTOMATED ACTIVATION OF LINKS CONTAINED IN THE DISPLAYING CONTENT SET

(71) Applicant: Catherine G. Lin-Hendel, Summit, NJ (US)

(72) Inventor: Catherine G. Lin-Hendel, Summit, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,841

(22) Filed: Jun. 9, 2015

(65) Prior Publication Data
US 2015/0346941 A1 Dec. 3, 2015

Related U.S. Application Data

(63) Continuation of application No. 14/463,870, filed on Aug. 20, 2014, now Pat. No. 9,053,205, which is a continuation of application No. 13/361,826, filed on Jan. 30, 2012, now Pat. No. 8,850,352, which is a continuation of application No. 12/753,749, filed on Apr. 2, 2010, now Pat. No. 8,108,792, said application No. 14/463,870 is a continuation of application No. 11/924,582, filed on Oct. 25, 2007, now Pat. No. 7,712,044, and a continuation of application No. 10/052,692, filed on Jan. 19, 2002, now Pat. No. 7,308,653.

(60) Provisional application No. 60/262,998, filed on Jan. 20, 2001.

(51) Int. Cl.
| | |
|---|---|
| G06F 3/0485 | (2013.01) |
| G06F 17/30 | (2006.01) |
| G06F 3/0484 | (2013.01) |
| G06F 3/0481 | (2013.01) |

(52) U.S. Cl.
CPC ........ *G06F 17/30905* (2013.01); *G06F 3/0485* (2013.01); *G06F 3/04817* (2013.01); *G06F 3/04842* (2013.01); *G06F 2216/07* (2013.01)

(58) Field of Classification Search
CPC ................ H04L 29/06; H04L 29/0809; H04L 29/08072; G06F 3/0485; G06F 3/04855; G06F 3/04847; G06F 3/048; G06F 3/0481; G06F 3/04812; G06F 3/04842; G06F 17/24; G06F 17/241; G06F 3/0482; G06F 17/30
See application file for complete search history.

(56) References Cited

U.S. PATENT DOCUMENTS

| | | | | |
|---|---|---|---|---|
| 5,874,936 A * | 2/1999 | Berstis | ................ | G06F 3/0481 715/785 |
| 6,912,694 B1 * | 6/2005 | Harrison | ................ | G06F 3/0485 715/784 |
| 6,940,488 B1 * | 9/2005 | Siddiqui | ................ | G06F 3/0312 345/163 |
| 2004/0117831 A1 * | 6/2004 | Ellis | ................ | H04N 5/44543 725/53 |

*Primary Examiner* — Xiomar L Bautista
(74) *Attorney, Agent, or Firm* — Barnes & Thornburg LLP; Thomas J. McWilliams; Edward F. Behm, Jr.

(57) ABSTRACT

An automatic scrolling mechanism converts an information repository into media that can actively present and "push" information to the users/viewers while retaining existing "pull" and interactivity functions. Automatic scrolling can be controlled by placing a cursor on control icons, such as boxes, lines, and arrow clusters. While the cursor is on an icon, automatic scrolling brings into view content that extends beyond the field of view. The scrolled content is moved into the field of view of the display window in a predetermined direction designated by the icon. Sub-windows are also designed to be independently and automatically scrolled or floated with respect the main window. Links created in an information repository may be automatically activated to retrieve the linked information, and to automatically present and scroll the information. As the content is automatically scrolled, the repository is pushed and the user is allured to further navigate through the repository.

26 Claims, 17 Drawing Sheets

AUTOMATED CHANGING OF CONTENT SET DISPLAYING IN THE DISPLAY SCREEN OF A BROWSER AND AUTOMATED ACTIVATION OF LINKS CONTAINED IN THE DISPLAYING CONTENT SET

CROSS-REFERENCE TO RELATED APPLICATIONS

This application is a continuation of U.S. patent application Ser. No. 14/463,870, filed Aug. 20, 2014, entitled "Automated Scrolling of Browser Content and Automated Activation of Browser Links", which is a continuation of U.S. Ser. No. 13/361,826, filed Jan. 30, 2012, now U.S. Pat. No. 8,850,352, issued Sep. 30, 2014, entitled "Automated Scrolling of Browser Content and Automated Activation of Browser Links", which is a continuation of U.S. patent application Ser. No. 12/753,749, filed Apr. 2, 2010, now U.S. Pat. No. 8,108,792, issued Jan. 31, 2012, entitled "Automated Scrolling of Browser Content and Automated Activation of Browser Links, continuation of U.S. patent application Ser. No. 11/924,582, filed Oct. 25, 2007, now U.S. Pat. No. 7,712,044, issued May 4, 2010, entitled "Automated Scrolling of Browser Content and Automated Activation of Browser Links," continuation of U.S. patent application Ser. No. 10/052,692, filed Jan. 19, 2002, now U.S. Pat. No. 7,308,653, issued Dec. 11, 2007, entitled "Automated Scrolling of Browser Content and Automated Activation of Browser Links", which claims benefit of U.S. Provisional Patent Application Ser. No. 60/262,998, filed Jan. 20, 2001, entitled "Automated Scrolling," which applications are incorporated by reference herein in their entirety.

FIELD OF THE INVENTION

This invention relates to automatically scrolling parts of, or the entire content information displayed in a browser page. The invention also relates to partitioned display windows within browsers, and more particularly to display windows that include a plurality of structures that can effectuate scrolling through the content or pages of a browser wherein such content or pages extend beyond the limits of a display window.

The invention also relates to preprogramming automated activation of links contained in browser pages, and automated scrolled presentation of the linked information.

BACKGROUND

The two major classes of electronic media formats that present information to viewer of the information are: (1) the television/video format, and (2) the browser/web format. The television/video format actively presents/pushes continually changing information to passive viewers. The browser/web/computer format is passive, requiring a viewer to "pull" information from the storage devices of that media by entering input requests/commands through an input device. In other words, the viewer is required to actively navigate the browser/web/computer format to receive information.

While the television/video format is convenient, requiring no viewer effort, it lacks interactivity. The browser/web/computer format, on the other hand, sits still, is static until a viewer makes an input/request through an input device to request or navigate to certain information. As can be seen, the browser/web/computer format allows for one input/request at a time for one piece of particular information, a procedure that is tedious and tiring.

Referring now to FIG. 1, for browser/web pages 10 wider or longer than display window 12, conventional browsers 14 include vertical scroll arrows 16a and 16b in combination with a vertical scroll bar 16 at the right edge of the browser 14 to move the content up-and-down within the display window 12. Furthermore, horizontal scroll arrows 18a and 18b in combination with a horizontal scroll bar 18 are provided at the bottom edge of the browser 14 to move the content left-and-right within the display window 12.

In operation, the user of a computer may scroll through the content by moving the cursor 20 to one of the scroll bars 16 or 18, pressing down the left key of a mouse and dragging the scroll bar, up, down, left or right, via the mouse. When using the scroll bars 16 or 18, the entire content (top to bottom) is scrolled substantially within the designated dragging area of the display window. Hence, when dragging the scroll bar 16 or 18, a user can gradually, or quickly at the speed of the fingers' dragging motion permits, move to the end of the content by dragging the scroll bar 16 or 18 to a desired point, or to the end of such designated dragging area. Alternately, the user could scroll in incremental steps or distances up, down, left or right within the content by repeatedly click the left key of the mouse on any one of the scroll arrows 16a, 16b, 18a and 18b. As can be appreciated, these approaches are tedious and finger tiring. Moreover, this approach is even more tiresome when using a mouse-pad to operate the scroll arrows 16a, 16b, 18a and 18b and scroll bars 16 and 18.

In order to access and view additional information linked to a particular browser/web/computer-display page through the "links" contained in the page, the viewer must move the cursor to a particular link (for example, by holding down the left button of a computer "mouse" input device and sliding the "mouse" on a "mouse pad"), and "click" (the mouse left button) or push a button of an input device to request that particular information to be displayed on the display screen. Such operation must be performed one-link at a time, while requiring the viewer to know exactly which "link" to "click" for what information, or to explore, experiment, and guess.

SUMMARY

The present invention contemplates a method of displaying and navigating through repositories of information via a browser by automatically scrolling the content/pages of an information media without requiring user/viewer input. Thus, the repository of information is actively "pushed" to the user, while also allow user to interact with the information and the media. The method automates sequences of blinking links and activates links that contain essential and/or important information to particular sets of viewers/users; and automatically and sequentially presents/pushes such information to particular sets of viewers/users. The same technique can be used to "partition" a TV/video screen and make the TV/video screen "interactive." For example, a model is wearing a particularly stunning dress, you can click on the female figure, and the information, and the purchasing link appears on a separate sub-window. Similarly, if you like the "car" James Bond is driving, or the suit he is wearing, you can do the same.

The present invention also contemplates at least one sub-window inside a browser's main-window that can be independently and automatically or manually scrolled to display content of that sub-window extending beyond the viewing field of that sub-window. Or, the sub-window can remain floating in-place on the computer/browser display screen, while the main page(s) of the browser window is automatically or manually scrolled to bring into view the page content that extends beyond the limits of the main browser window.

Furthermore, the present invention contemplates a method of controlling the automatic scrolling within a window or sub-window of a browser/web media page.

BRIEF DESCRIPTION OF THE FIGURES

FIGS. 5A-5G illustrate an application of this invention in a Tutorials/Guide environment, where instructions for the user's action is contained in a floating box that remains within viewing field, while the changing content of the Tutorial/Guide is automatically activated and scrolled through the browser window's viewing field.

DETAILED DESCRIPTION

Figure 1:
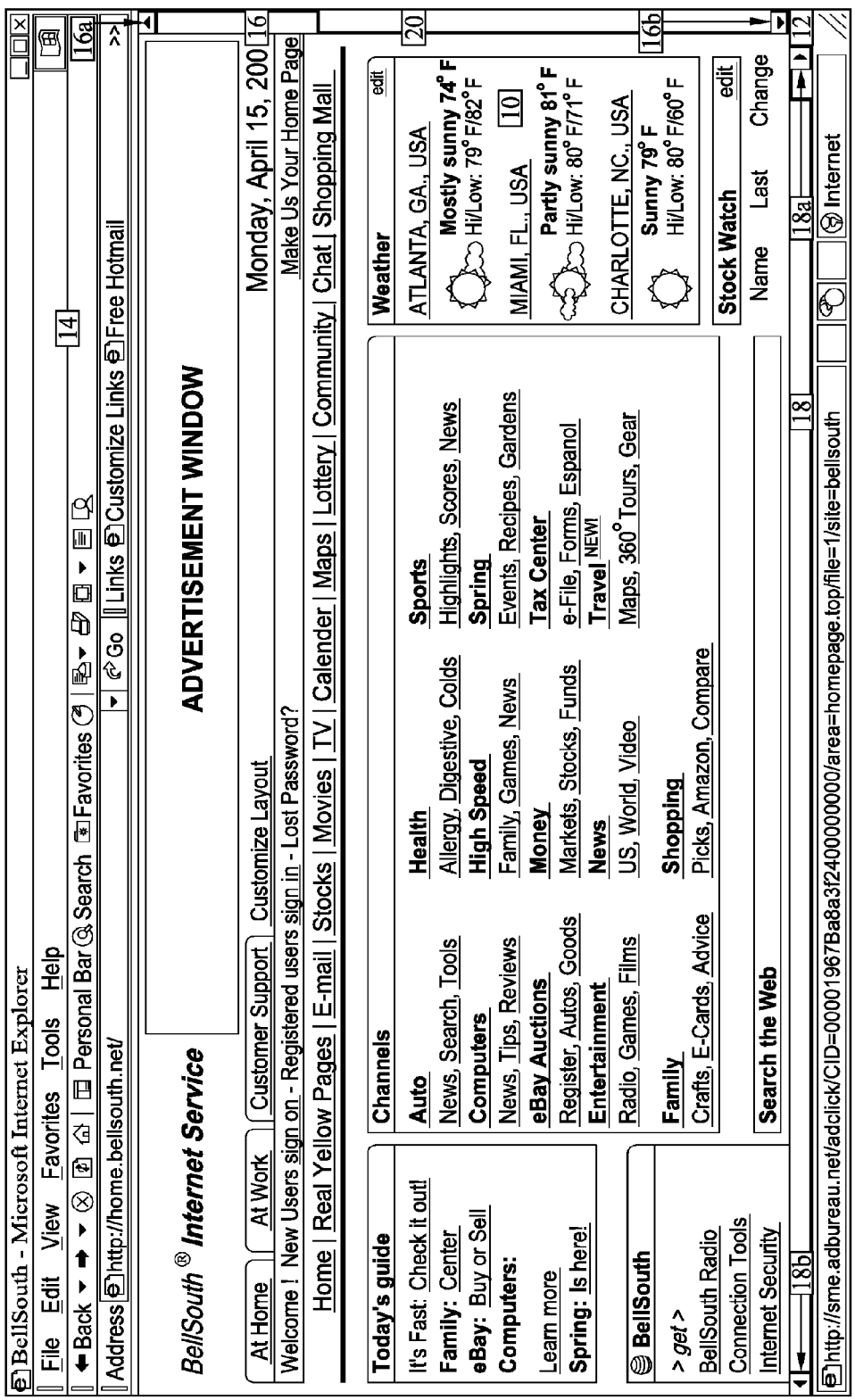
FIG. 1 illustrates a conventional browser in combination with a page presented by the conventional browser.
Figure 2:
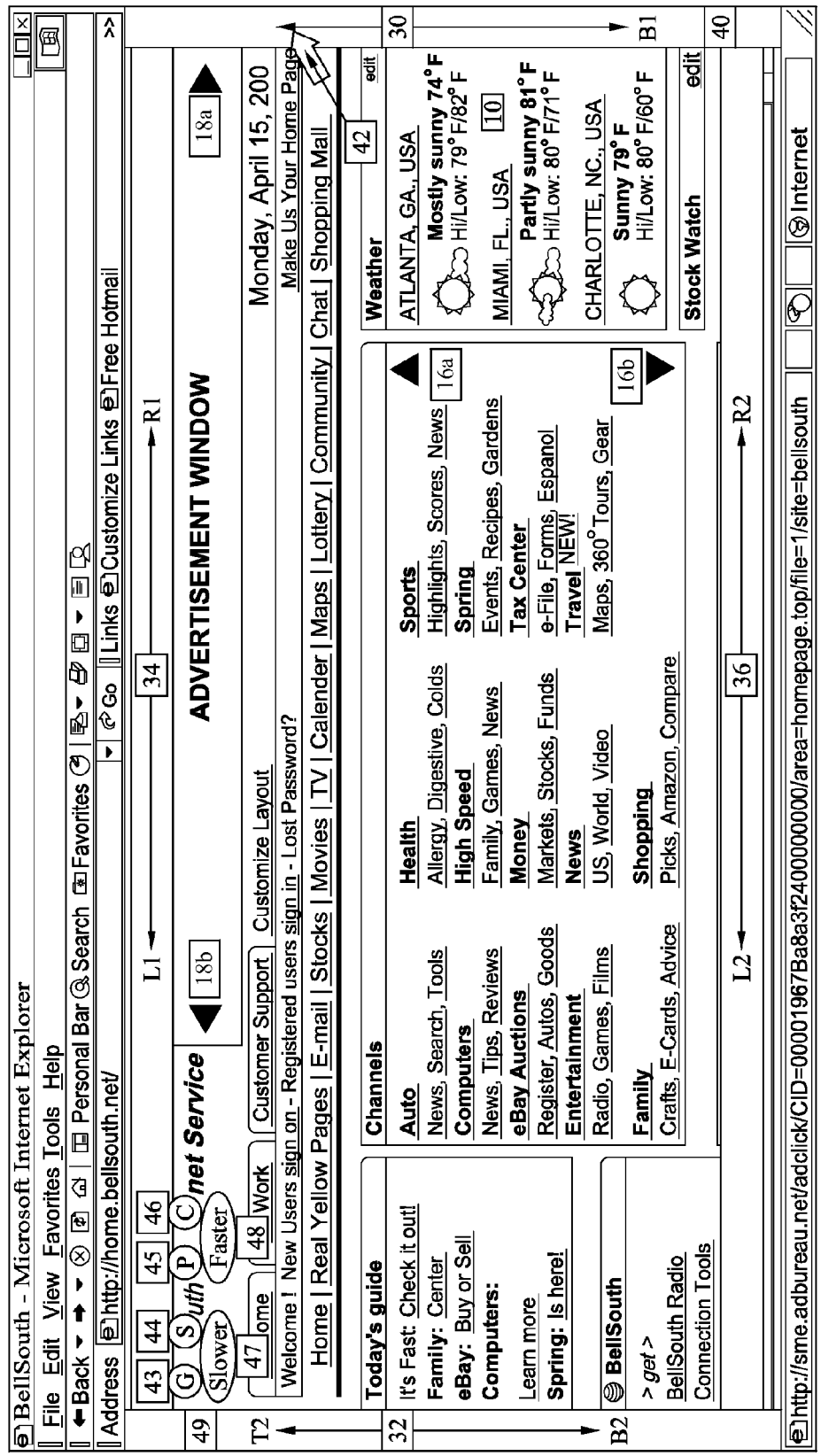
FIG. 2 illustrates the browser, in accordance with the present invention, in combination with a page, containing the floating border structure that facilitates user control of the automated scrolling.

Referring now to FIG. 2, the present invention can be added as additional tool, or substitutes for the vertical scroll arrows 16a and 16b in combination with the vertical scroll bar 16 and the horizontal scroll arrows 18a and 18b in combination with the horizontal scroll bar 18 with a first border floating structure 30 on the right edge, a second border floating structure 32 on left edge, a third border floating structure 34 on the top edge and a fourth border floating structure 36 on the bottom edge of the display window 40.

In the exemplary embodiment, the first, second, third and fourth border floating structures 30, 32, 34 and 36 are floating lines or boxes or other geometric shapes that have designated ends for designating a predetermine scrolling direction. The floating line or floating box is considered floating since it always stays in essentially the same position as the content moves within the field of view. The first, second, third and fourth border floating structures 30, 32, 34 and 36 are the user's control vehicle or mechanism for activating and controlling the automatic scrolling function.

In operation, when the cursor 42 is moved onto either of the top end T1, T2 of one of the first and second border floating structures 30 and 32, the page is automatically scrolled up (or down) to bring within the field of view the content of the page that extends beyond the bottom (or top) edge of the display window 40. Alternately, when the cursor 42 is moved onto either of the bottom end B 1, B2 of one of the first and second border floating structures 30 and 32, the page is automatically scrolled down (or up) to bring within the field of view the content of the page that extends above (or below) the bottom edge of the display window 40.

In an alternate embodiment, only one of these paired structures 30 and 32 are needed. Having both structures 30 and 32 brings added convenience to the user/viewer to choose for using the structure that is closer to the present cursor position.

Furthermore, placing the cursor 42 on either of the right-side end R1, R2 of one of the third and fourth border floating structures 34 and 36, would automatically scroll the page to the right (or left) to bring within the field of view the content previously beyond the left (or right) edge of the display window 40. Placing the cursor 42 on either of the left-side end L1, L2 of one of the third and fourth border floating structures 34 and 36, would automatically scroll the page to the left (or right) to bring within the field of view the content previously beyond the right (or left) edge of the display window 40.

Alternately or in-addition, the GO/STOP/PAGE/CONTINUOUS and SLOW DOWN and SPEED UP functions can be implemented with any desired/appropriate symbols or conventions. In the exemplary embodiment, a floating scrolling tool 42 is provided. The floating scrolling tool 49 includes a go button 43, stop button 44, page button 45, slower button 47 and faster button 48. The floating scrolling tool 49 is a user control tool implemented as an embodiment of this invention. It remains in view while the page content is scrolled through the viewing field.

The operation of the floating scrolling tool 49 will now be described. The go button 43 when clicked begins the automatic scrolling. The stop button 44 when clicked stops the automatic scrolling. The page button 45 when clicked advances the window to display the next full-page that is currently just out of the field of view. The continuous button 46 when clicked resumes the automatic scrolling from the current position. The go button 43 serves the same function, thus button 46 can be eliminated. Since people normally read in one direction, downward; and when there was no content beyond the left and right edges of the field of view, directionality need not be shown. However, if the page requires right and left directionality, directional buttons may be substituted for the single go button 43. Finally, the slower button 47 decreases the scrolling speed while the faster button 48 increases the scrolling speed.

The automatic scrolling is automatically stopped when the cursor 42 is moved away from the top ends T1, T2, bottom ends B1, B2, left-side ends L1, L2, and right-side ends L1, L2. Moreover, the automatic scrolling is automatically paused at every full-screen or full-window shift. When the scrolling is paused at a full-screen or full-window shift, the automatic scrolling can be resumed in the direction of the previous scrolling by clicking the left key of a mouse while the cursor 42 is still on a respective one of the ends.

Accordingly the automatic scrolling is essentially continuous within a full-screen or full-window shift, unless stopped by moving the cursor 42. Furthermore, scrolling can be programmed to automatically stop at the end of the content or page, to be resumed by clicking on a respective end for looping or reversing, or clicking on the go button 43 or continue button 46. It can also be programmed to loop after pausing, until the user clicks on a link to go else where in the information repository, or an automated link-activation sequence brings new pages to the browser.

The speed of the scrolling can also be controlled using an input device or mouse. For example, "clicking" the left button of the "mouse" (input device) while the cursor 42 is at an end would increase the speed of the automatic scrolling in the direction designated by the end. Moving the cursor 42 away from the top, bottom, left or right ends along and on a respective structure 30, 32, 34 or 36 would decrease the scrolling speed.

Figure 3:
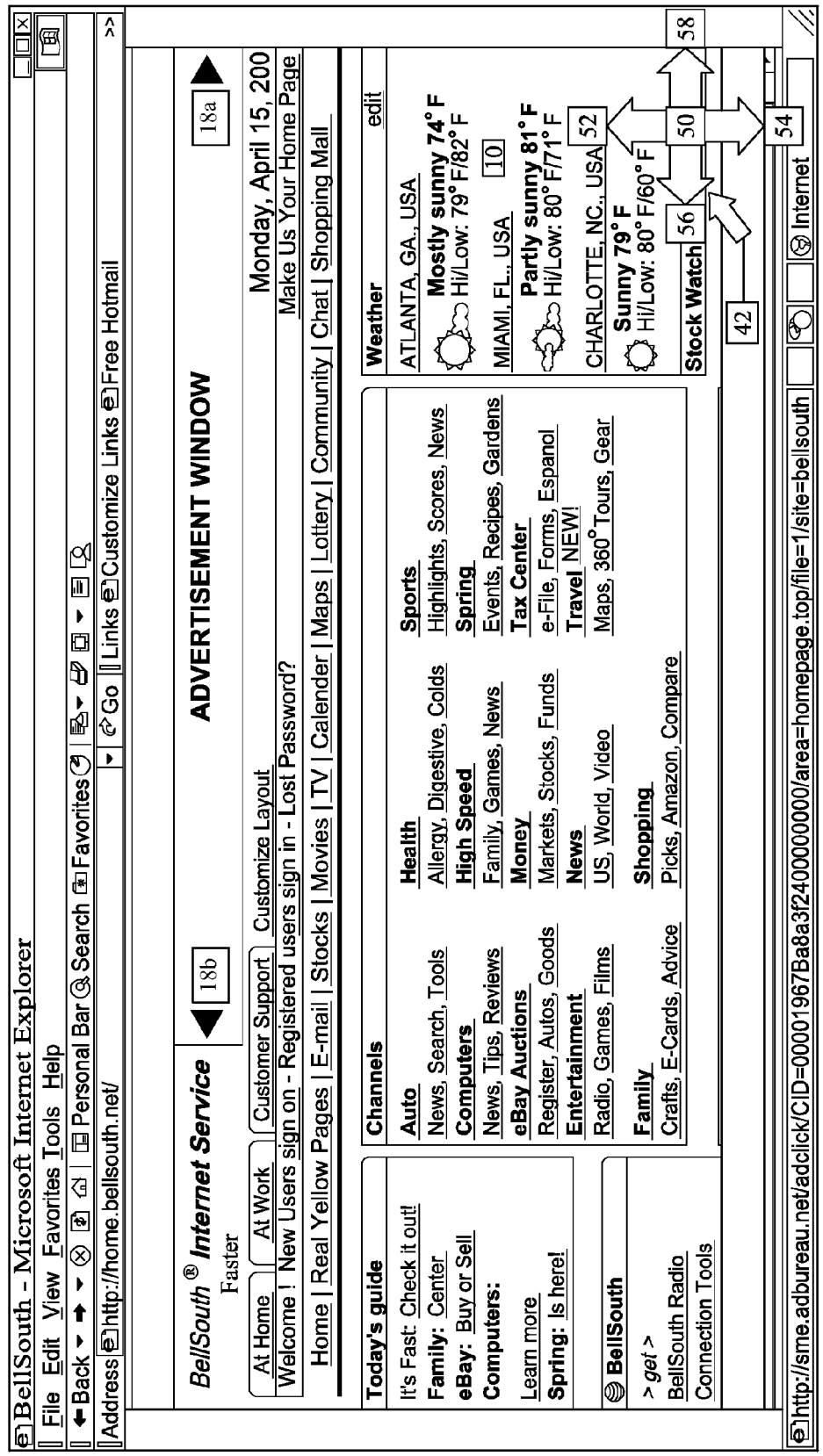
FIG. 3 illustrates an alternate embodiment of the browser, in accordance with the present invention, in combination with a page.

Referring now to FIG. 3, the user-control vehicle of the automatic scrolling of the present invention can also be implemented with a cluster of arrows 50 at one location. The cluster of arrows 50 includes an up arrow 52, a down arrow 54, a left arrow 56 and a right arrow 58. By placing the cursor 42 on a respective arrow, the content would shift at the direction of such arrow.

As can be appreciated, the present invention provides for automated scrolling within a display window 40 without the continual strain and motion of the fingers and hand that is required using the conventional "scroll bars" in browsers.

Figure 4A:
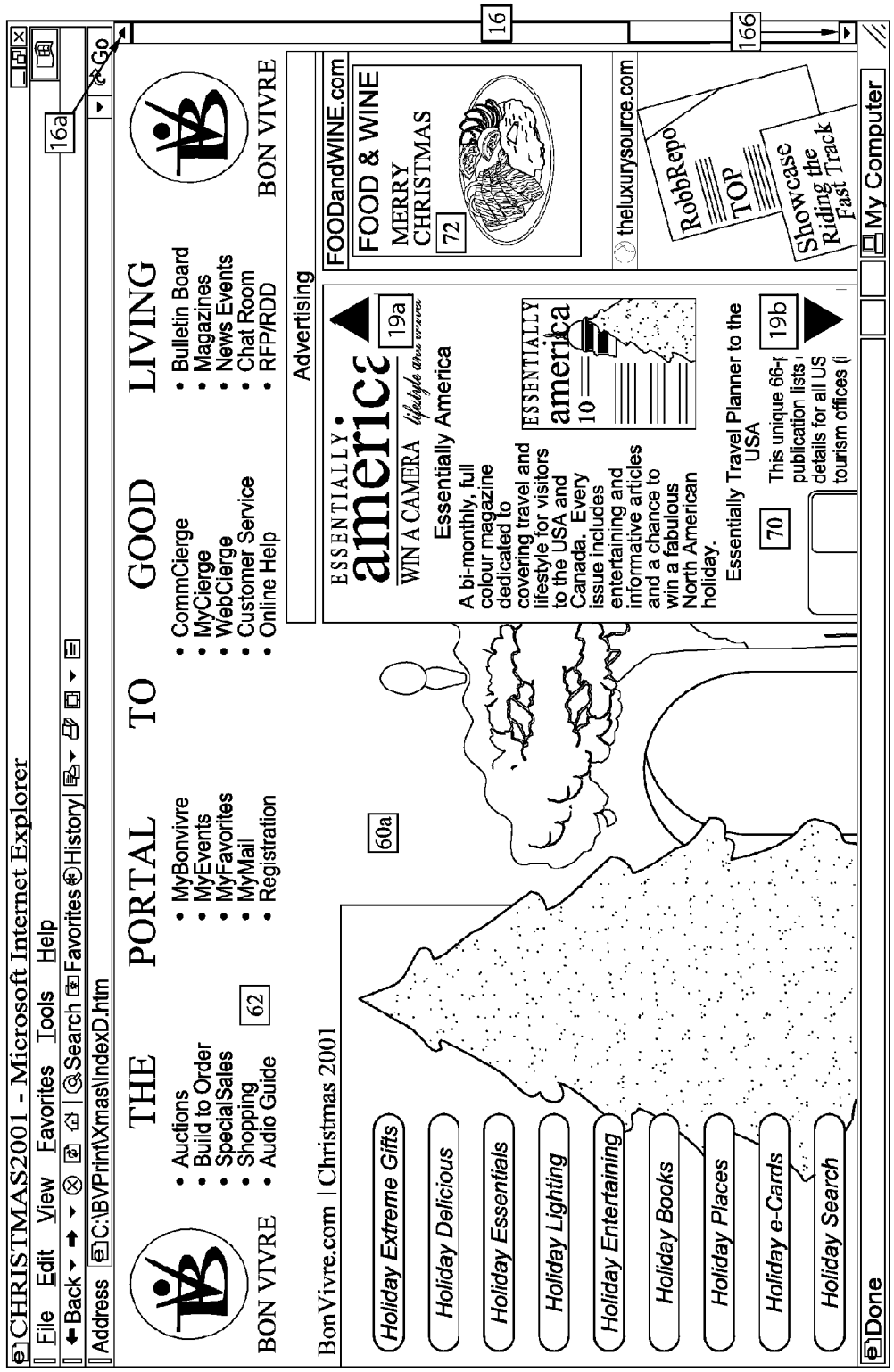
FIGS. 4A-4G illustrates examples of the separately controllable autoscrolling features in between the main page and sub-windows.
Figure 4B:
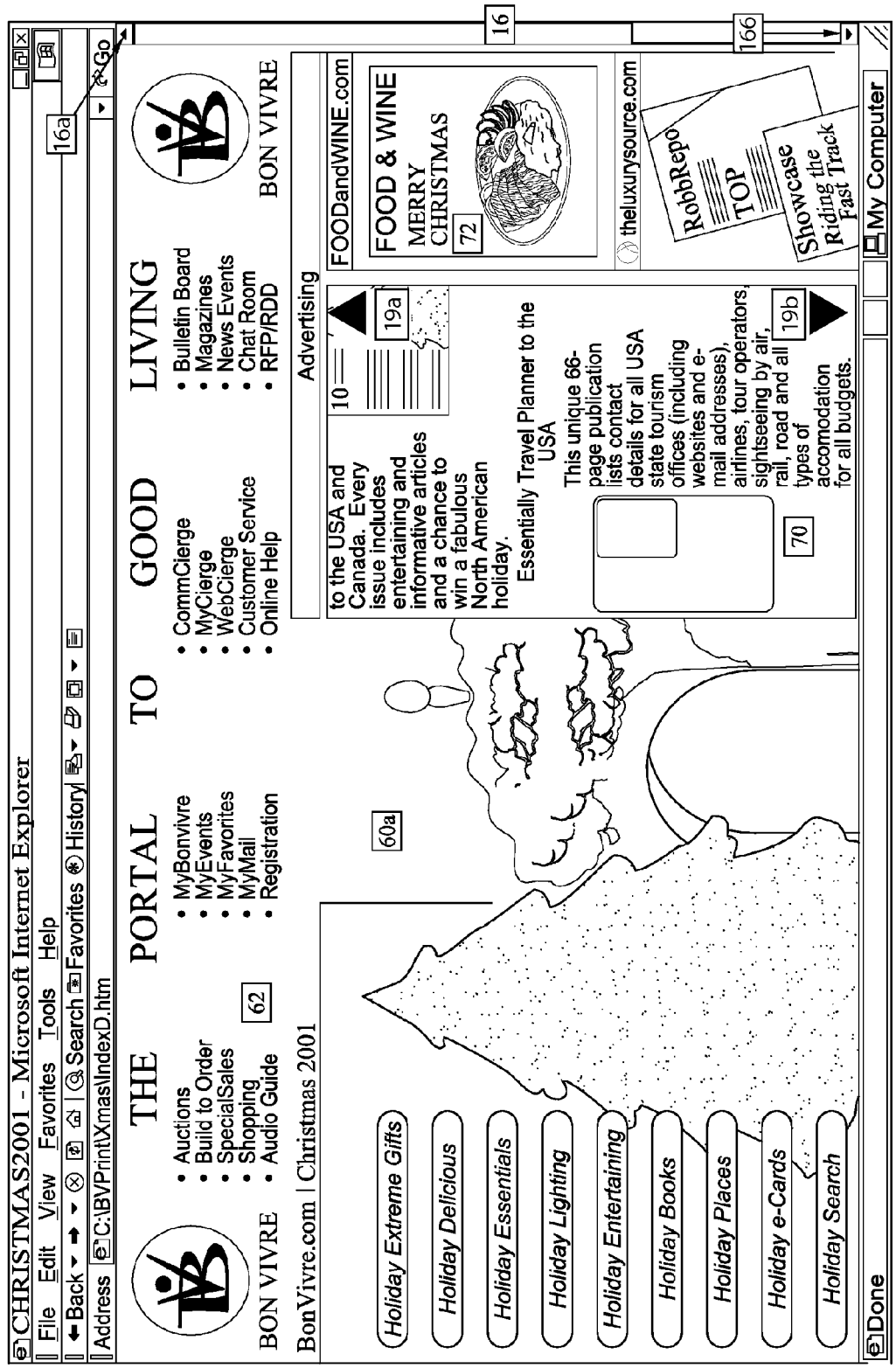

Referring now to FIGS. 4A-4G, examples of the auto-scrolling features of the present invention with multiple windows are illustrated. FIGS. 4A and 4B illustrate a main page 60 having a plurality of navigation links 62 at the top of the main page 60, to the left of the Christmas tree, and within the graphics. The navigation links 62 provide for navigation such as via HTML links within a website. The main page 60 includes sub-window partitions that form a pair of columns 70 and 72 that cover part of the field of view of the main page 60. Additionally, the main theme of the content 60a is provided to the left of the pair of columns 70 and 72.

For exemplary purposes, the pair of columns 70 and 72 is depicted as advertisement display sub-windows. Nevertheless, the main page 60 may have any number of sub-window partitions that may be vertically or horizontally oriented, or cut into random areas of the main content. The right column 72 of the advertising display and the main content area 60a are stationary while the left column 70 is automatically scrolling.

As can be appreciated, the present invention can be used to automatically scroll partitioned information apart from a browser/web, or TV/Video's main content, such as financial market news and summaries, weather reporting, special features, sports news, movie previews, special stories, or advertisements.

Figure 4C:
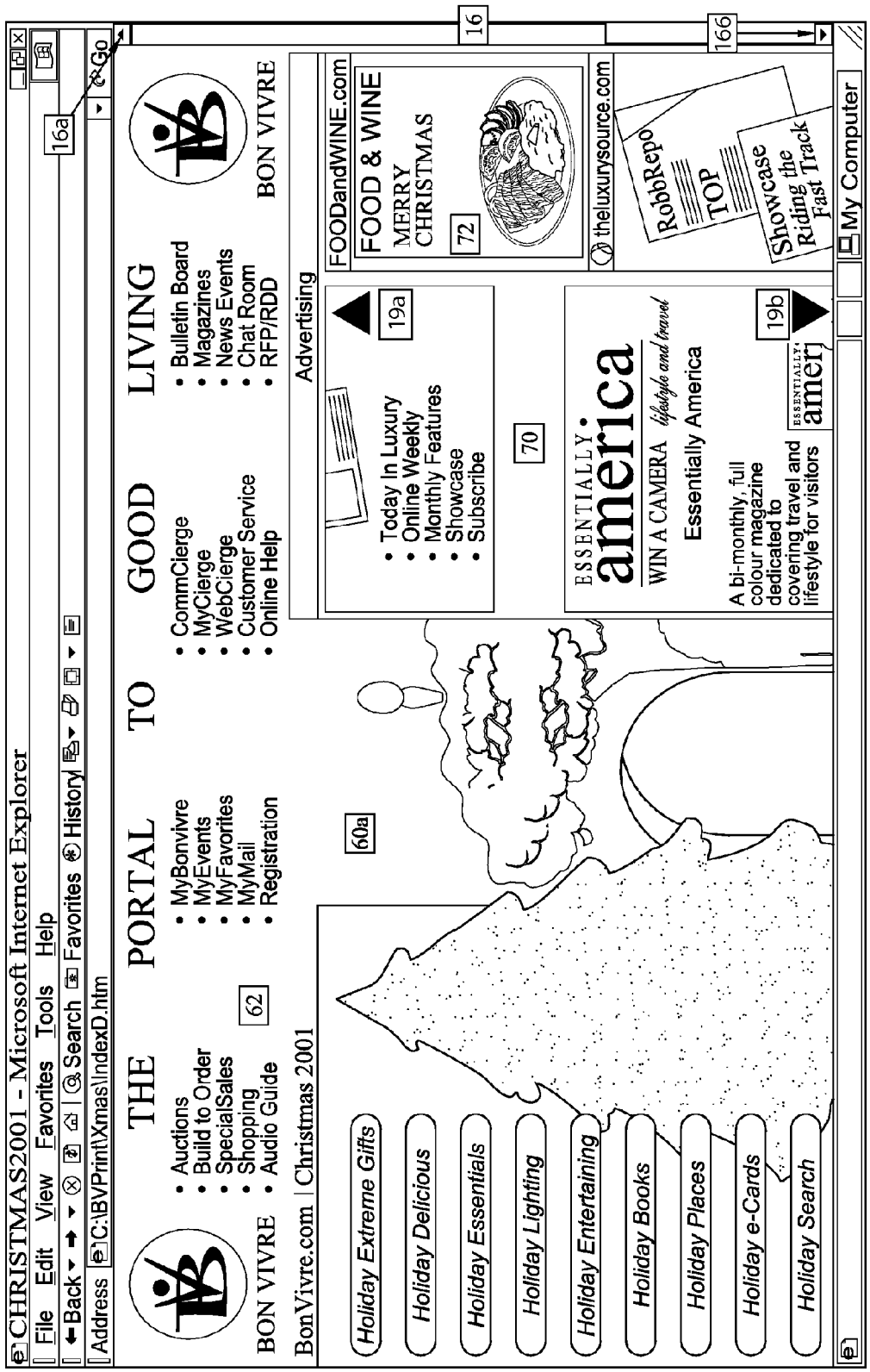

Referring now to FIGS. 4A-4C, the main page 60a and the right column 72 are automatically scrolled in synchronization with 60a, or can be manually scrolled using the conventional browser scroll bar 16 or the vertical scroll arrows 16a and 16b along with 60a. The left column 70 continues to automatically scroll independently of the main page 60a and the right column 72.

Figure 4D:
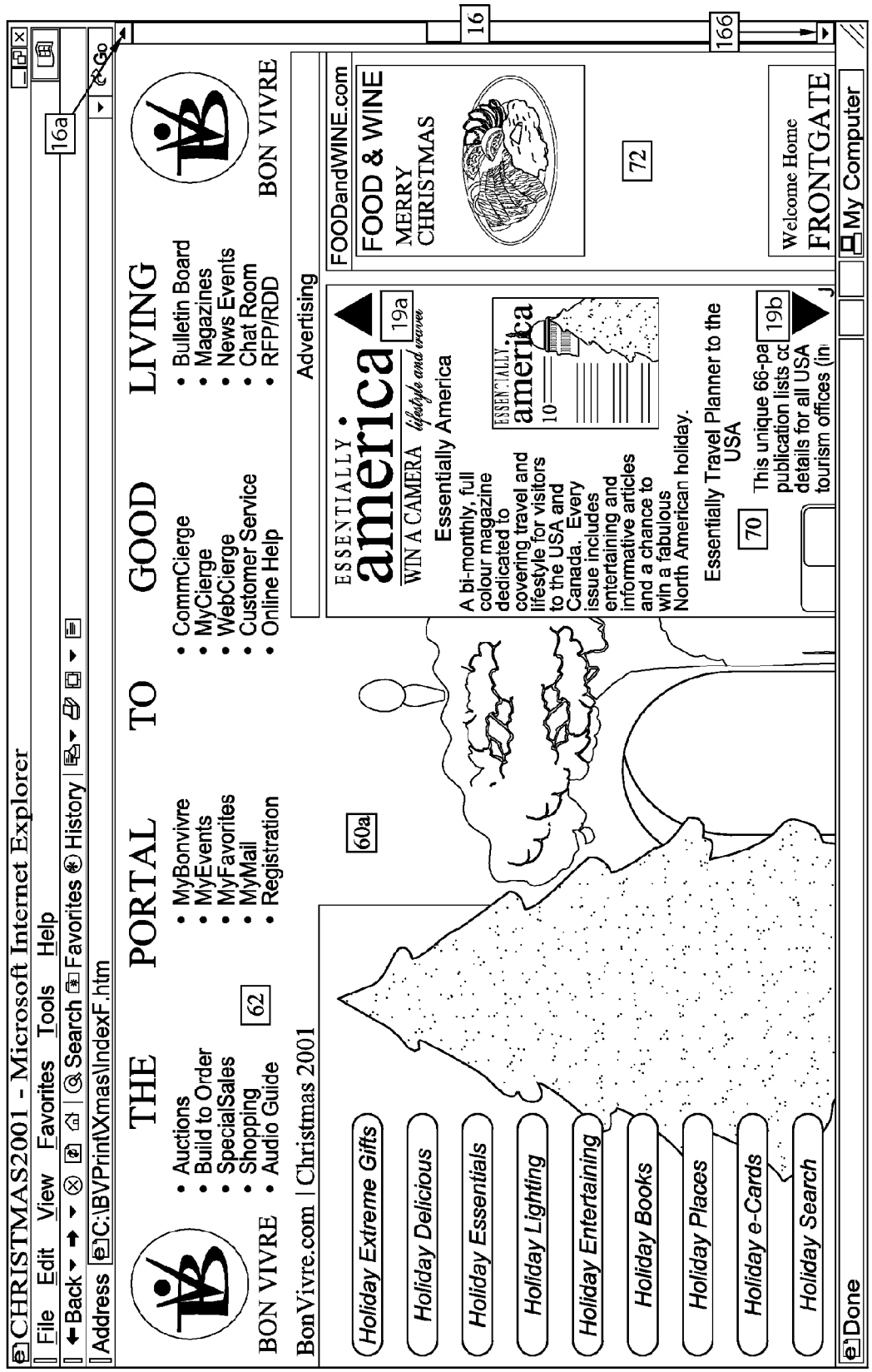
Figure 4E:
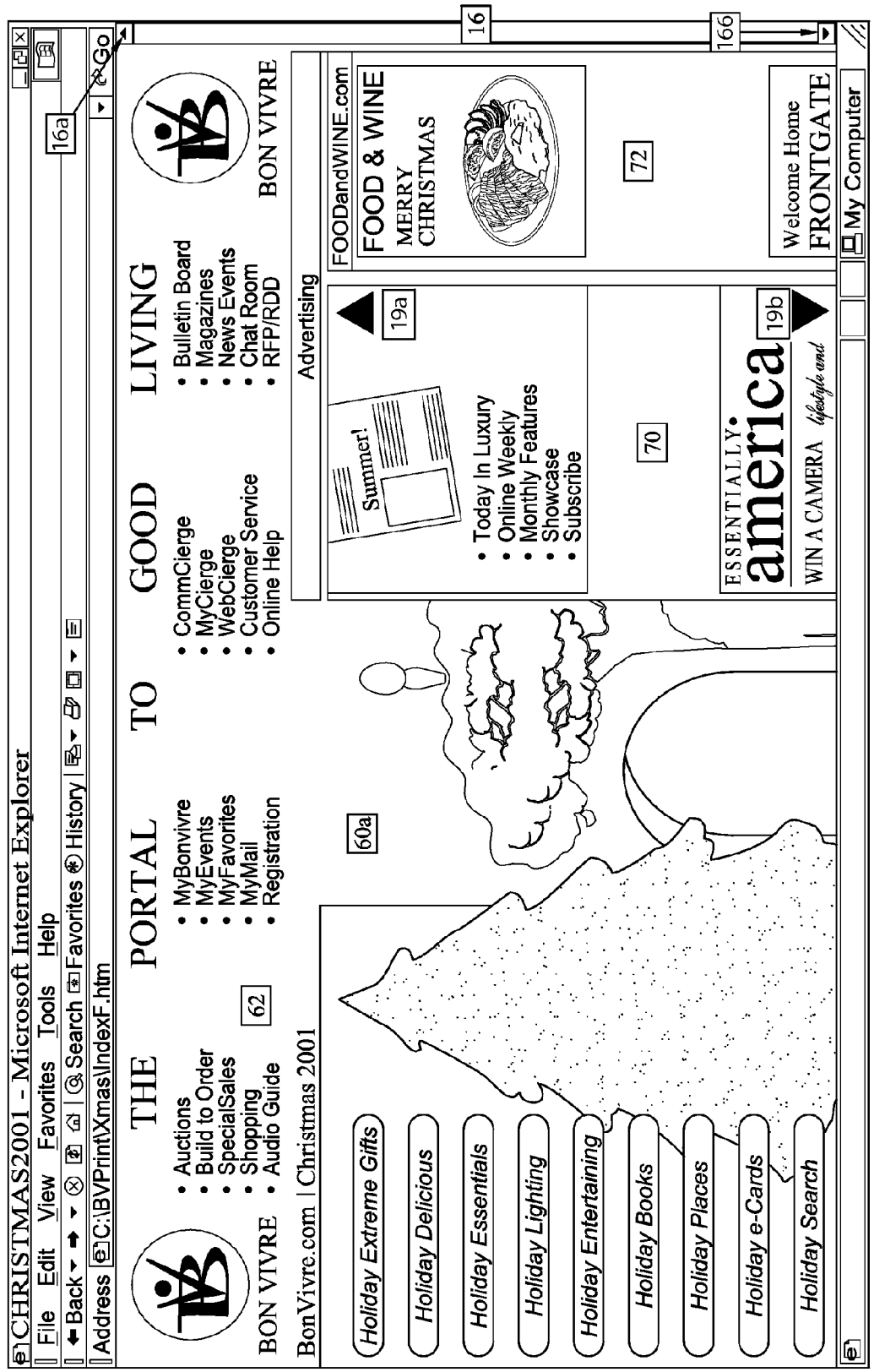
Figure 4F:
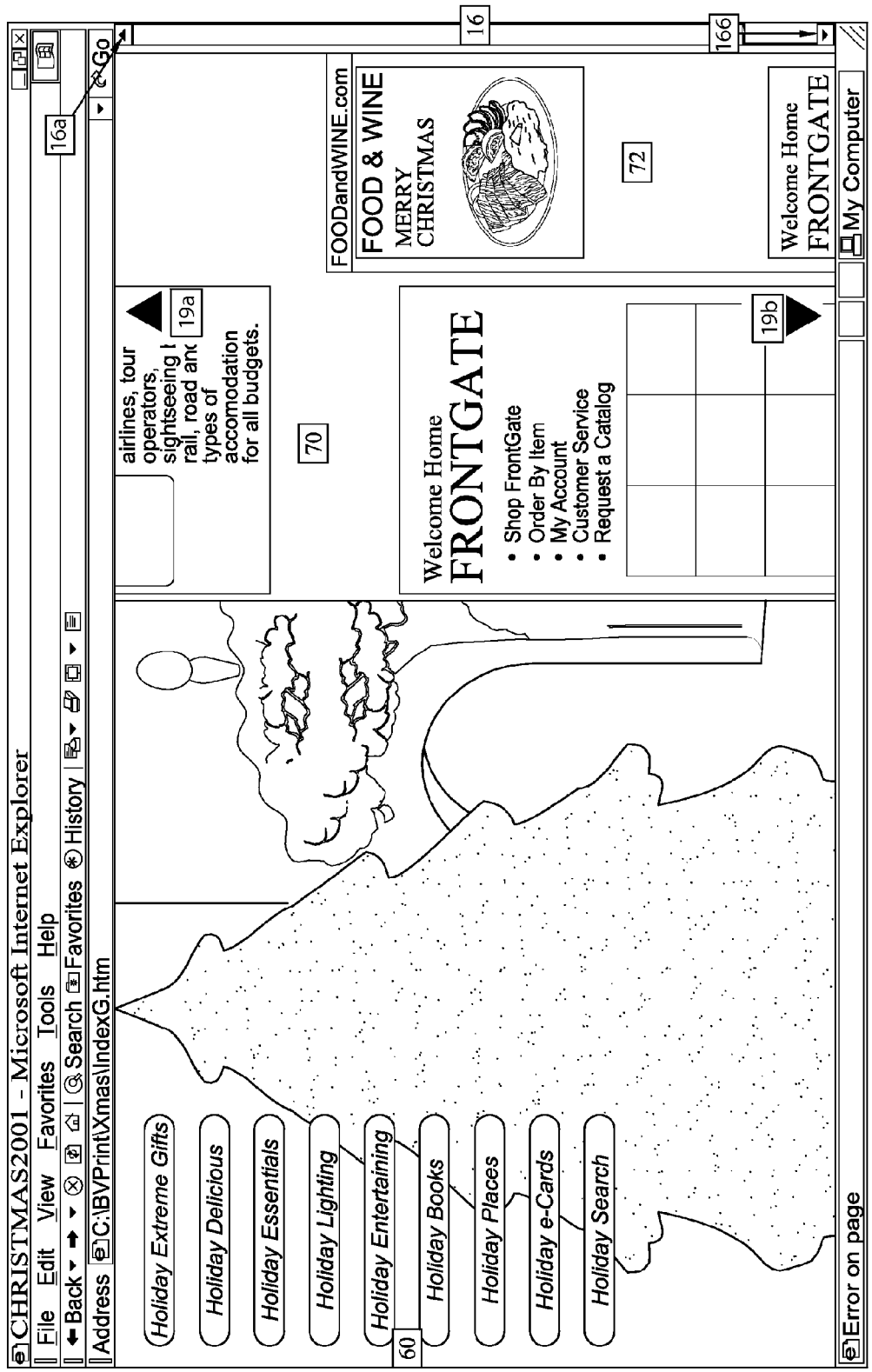
Figure 4G:
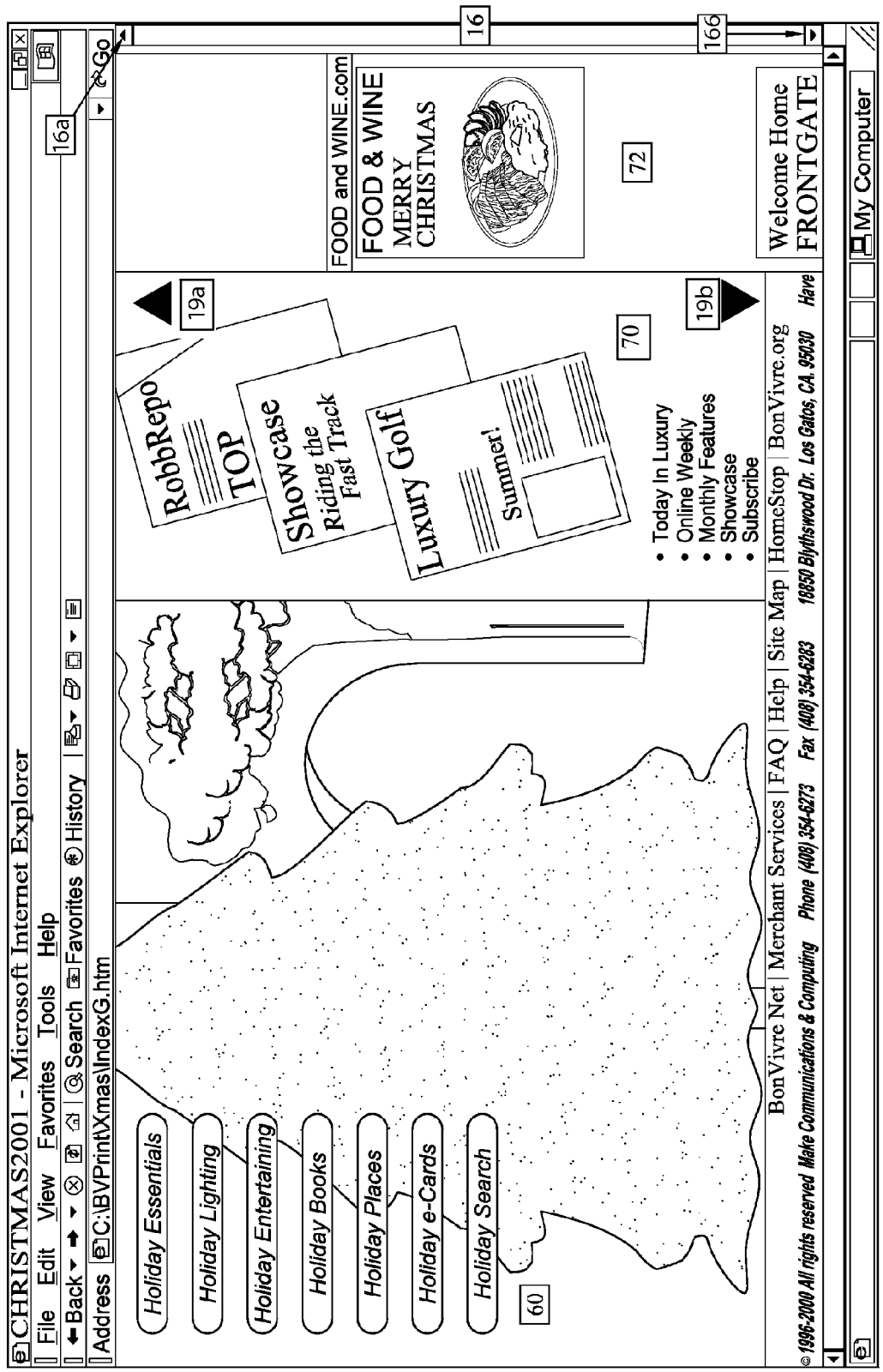

FIGS. 4D and 4E illustrates the left column 70 is automatically scrolling independently. The right column 72 is floating independently in view, while—the X-tree may be auto scrolled or manually scrolled independent of column 70 and 72.

Referring now to FIGS. 4D and 4E, the main page 60a and the left column 70 may be each independently automatically scrolled at different speeds. For example, the main page 60 is automatically scrolled at a first speed while the left column 70 is scrolled at a second speed higher than the first speed. The right column 72 remains stationary or floating in view.

It should be noted, the scrolling within the main page 60, 60a, left column 70 and/or the right column 72 can be effectuated using the first, second, third and fourth border floating structures 30, 32, 34 and 36 described in detail above. Additionally or alternatively the floating scrolling tool 49 may be provided. The columns 70 and 72 are for advertisement in the exemplary embodiment; such columns do not generally require scrolling control. However, for sub-windows that display weather reports, stock quotes, feature stories, etc., the floating scrolling tool 49 may be incorporated.

The pair of columns (sub-windows) 70 and 72 do not need to be separated in columns from the remainder of the browser main page 60. They can be cut-ins within the main page 60 as shown in FIG. 2, or overlap the main page, as shown in FIGS. 5A, 5B, 5C, 5D, 5E, 5F.

Figure 5A:
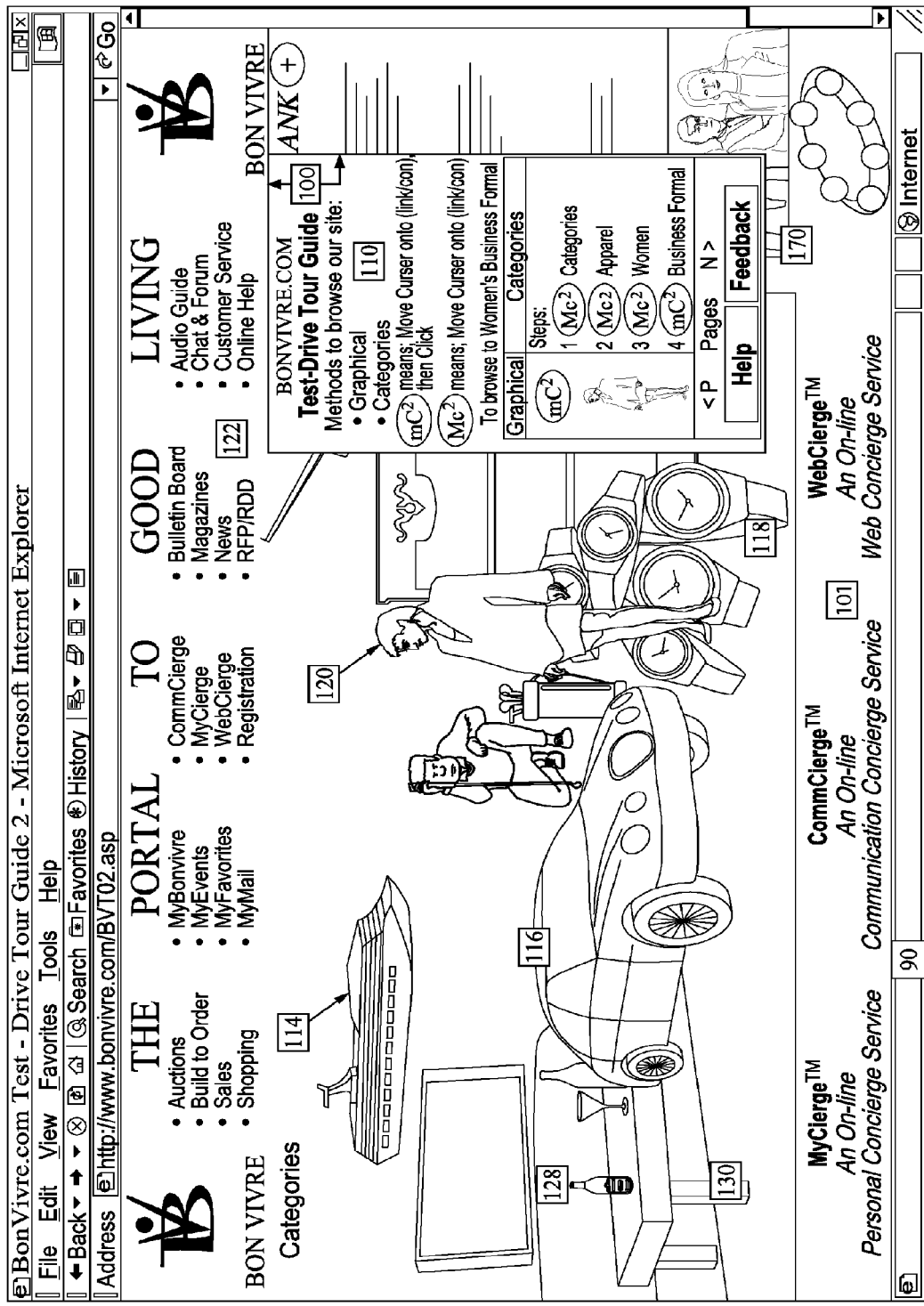
Figure 5B:
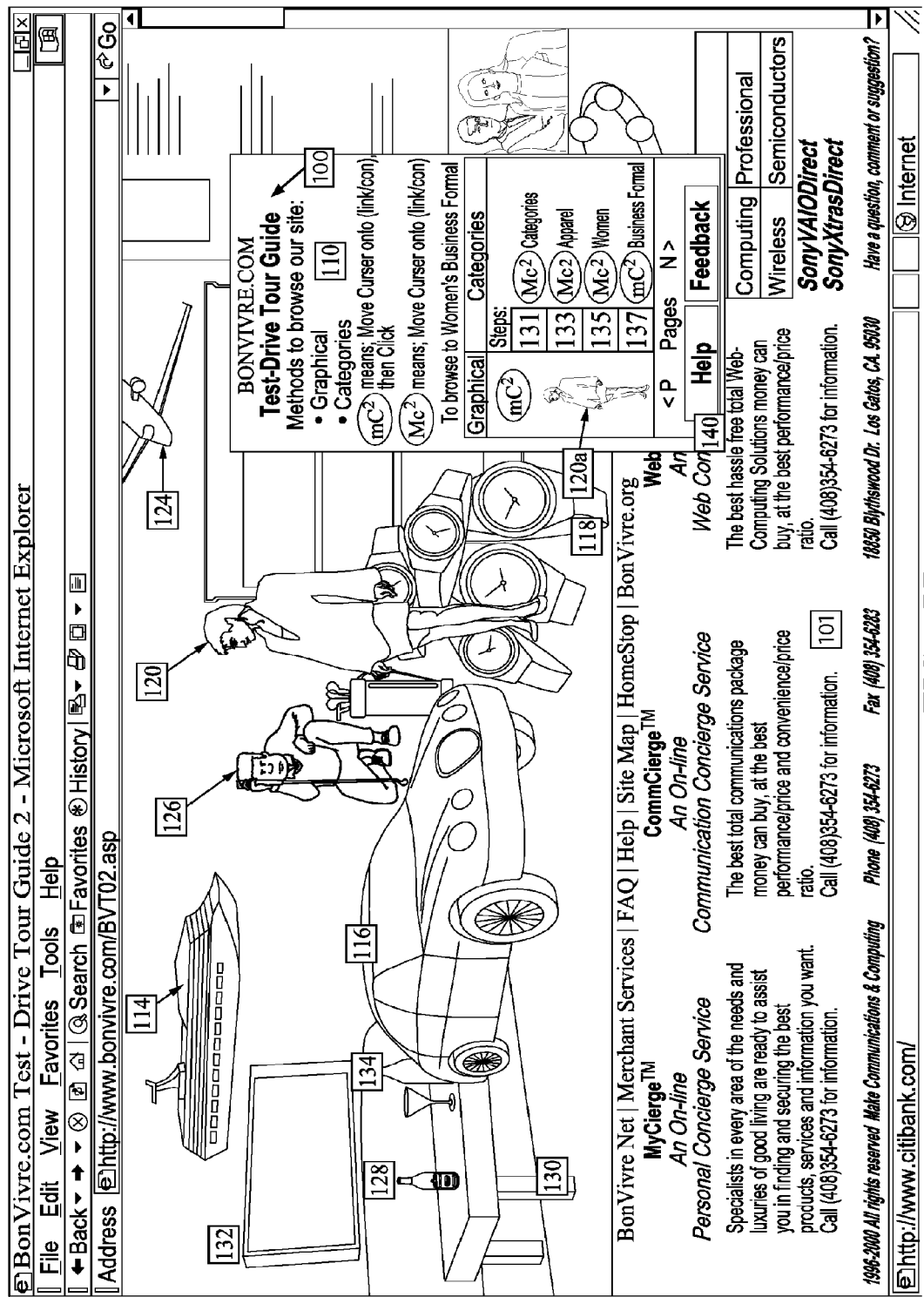
Figure 5C:
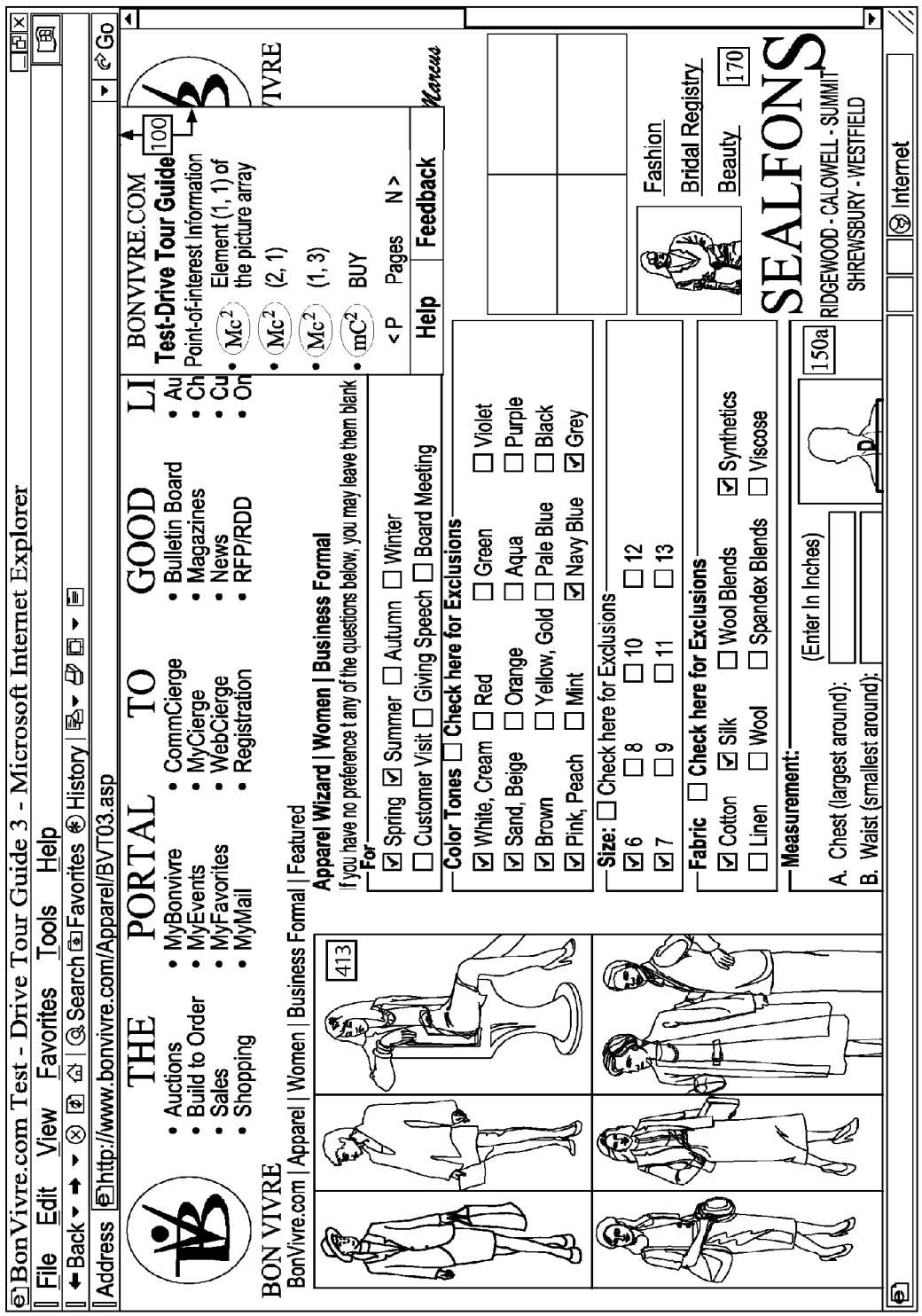
Figure 5D:
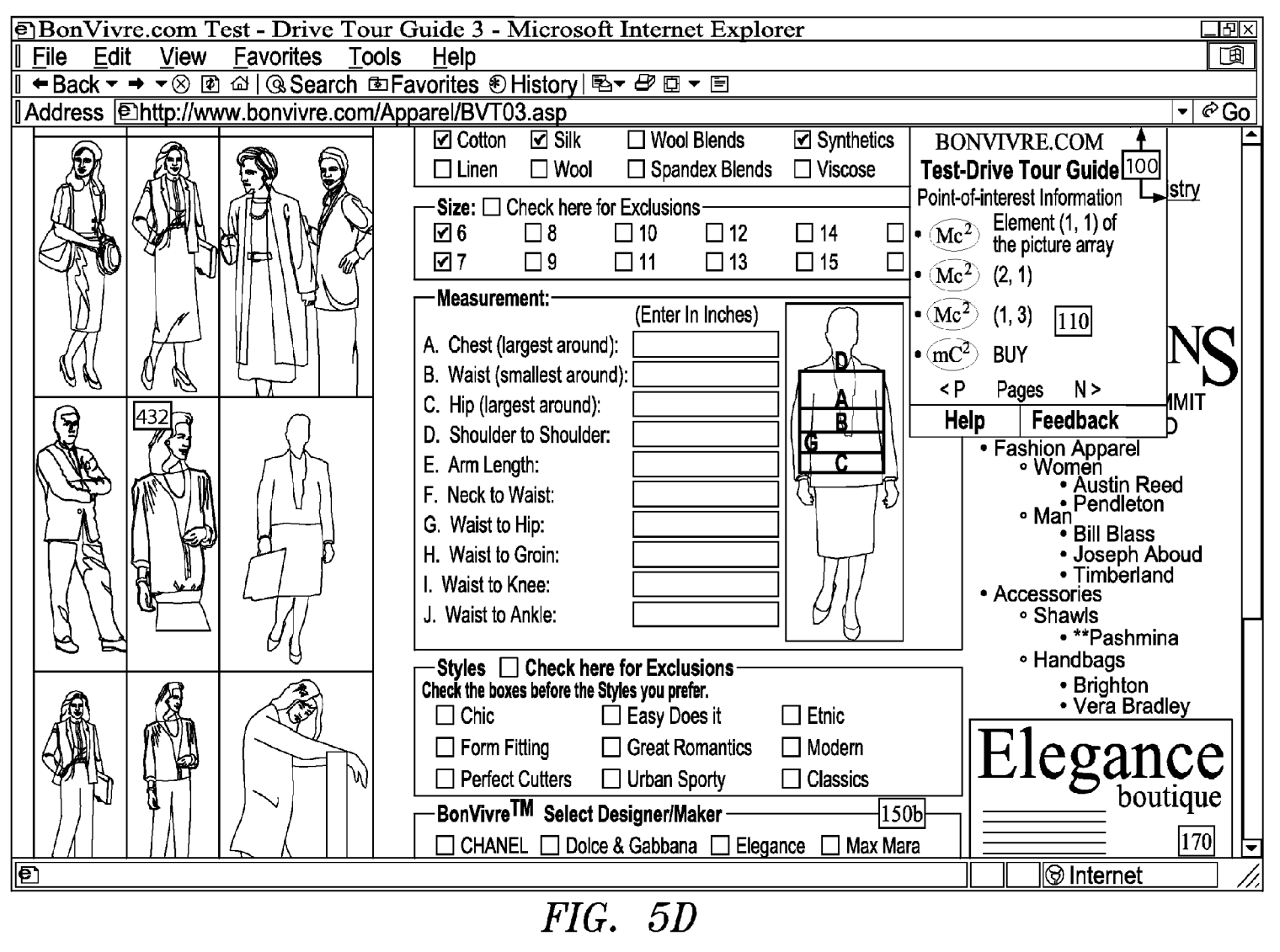
Figure 5E:
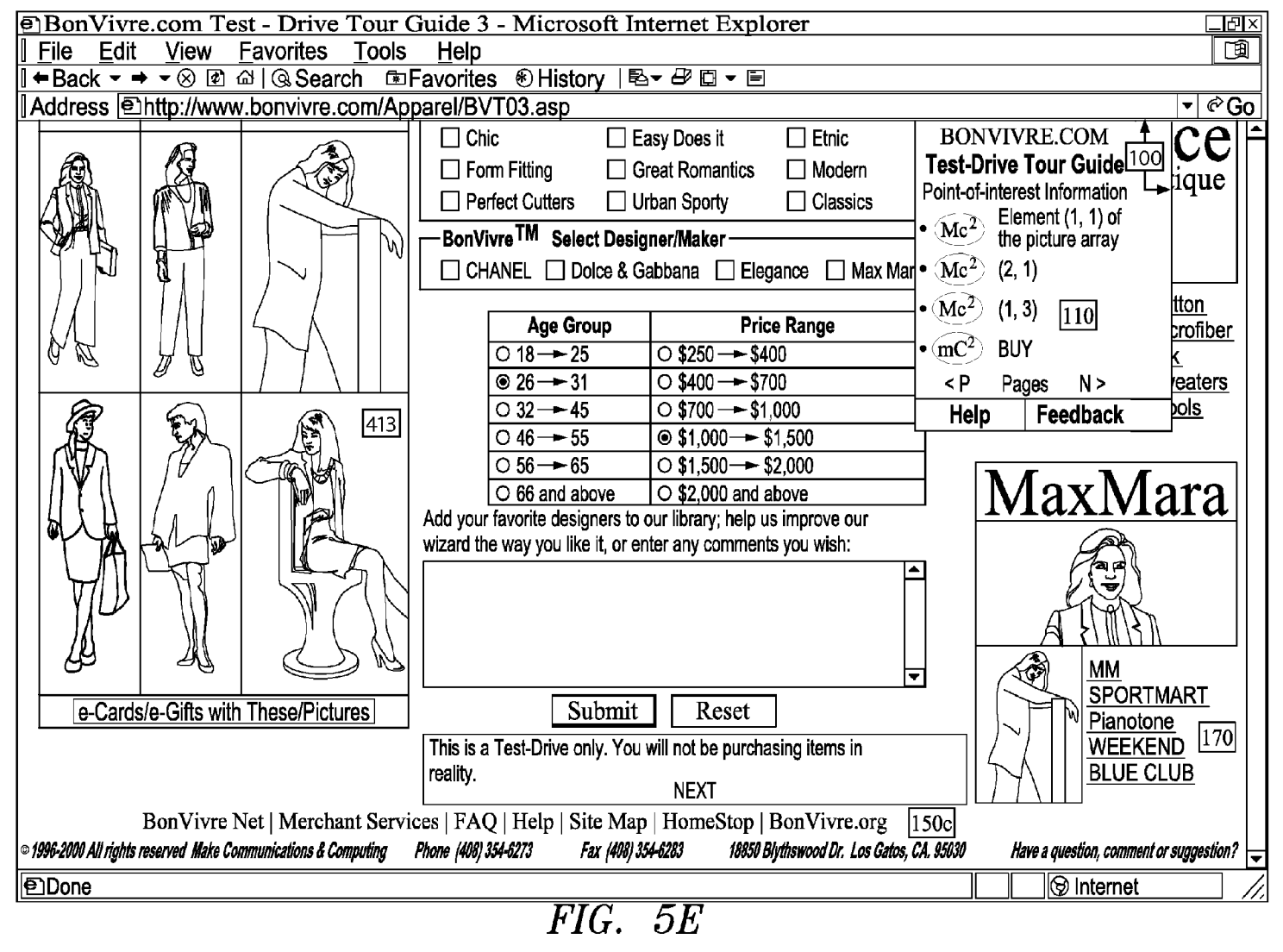

Referring now to FIGS. 5A-5F, the present invention is applied to creating a Tutorial/Guide to a new dynamic push/pull, active/interactive website. FIGS. 5A, 5B, 5C, 5D, 5E, and 5F illustrate that instructions for users/viewers are contained in a floating instruction box 110 overlapping the field of view of the browser's main window 90. The content of the main pages are automatically and continually scrolled through the field of view of the browser window 90. The present invention uses sequences of preprogrammed, automatic activation of links to automatically retrieve the additional linked information, and scroll, present, and "push" such automatically retrieved information continually to the user/viewer as shown in FIGS. 5C, 5D, 5E. The "link" (HTML, XML, DTML, etc.) that is to be automatically activated would "blink" (highlighted or emphasized in a manner to call attention directly thereto) before activation. All links contained in the scrolled pages, as well as in the floating "instruction box" are functional, ready to receive user/viewer action/input or selection.

FIGS. 5A, 5B, 5C, 5D, 5E and 5F illustrate an application of the presents invention in a Tutorials/Guide environment, where instructions for the user's action relevant to the displayed information/page is contained in a floating instruction box 110 while the content of the Tutorial/Guide (as conveyed by the illustrations and text content) is automatically scrolled through the browser window 100. Any sequence of links (HTML, XML links, DTML links, or other links that can be clicked to navigate to a different page) are pre-programmed to be automatically invoked or activated to retrieve (navigate to) the linked information, to scroll, present, and "push" to the user, even if the user does nothing. All links contained in the scrolled pages, as well as, in the floating instruction box 110 are functional to receive the user's input or selection.

In the preferred embodiment, links in the pages are preprogrammed to flash and are activated automatically. When activated, the link's resulting information is displayed (navigated to), automatically scrolled and pushed to the viewer. In the exemplary embodiment, the graphical images of the cruise ship 114, vehicle 116, watches 118, a dressed women 120, etc. are links. Everything displayed can be a link including: the airplane 124, the man 126, the wine 128, the table 130, the picture 132, the furniture 134, even the background is a link to something. All of these links are active and functional while scrolled, and all and any of these links can be pre-programmed into automated activation sequences. Moreover, most text phrases or words are navigational links, such as word phrases 122.

When a cursor is placed on a link—whether it is an image, a part of an image, or text, there is a small dialog box (NOT SHOWN) that shows up to describe the link. In the exemplary illustrations, the link flashed and automatically activated is the dressed woman 120 in 5A and 5B, that results in the appearance/display and scrolling of FIGS. 5C, 5D, and 5E.

Additionally, the floating instruction box 110 includes a graphical icon 120a of that same picture of the dressed woman 120, instructing or alluring the user to move the cursor onto the graphical women icon 120a and click. The automated feature of the link navigates the user to the women's business formal section.

The floating instruction box 110 contains instructions regarding what to do, and contains active links 131, 133, 135 and 137 to navigate to additional information. The help button 140 provides access to additional instructions. The feedback button allows the user to provide feedback. The "floating" feature of the floating instruction box 110 allows such box to be within view so that it can be accessed anytime as the main pages 100 are scrolled. It can also be "double clicked" out of view, or "double clicked" back into view, or controlled by any desirable control symbol or convention, such as the standard "−" window-minimizing icon in Microsoft applications. As the user interacts with the instructions in the floating instruction box 110, a new page is displayed (navigated to) and new instructions relevant to such new page appear in the floating instruction box 110, so that the user does not have to go elsewhere to look for help/guide/instruction material.

All of the educational or help/guide/instructional material has instructions at a certain place on a page, or even previous pages. Therefore, when the user wants to look at it again, the user can scroll or page back to where the instruction was—if it is remembered where it was seen, and lose the place where you are actually working on, and needing those instructions that was way back where you don't remember.

The floating instructional box 110 further includes <P Pages N> for moving to previous or next pages when the <P or N> is clicked.

In the exemplary embodiment, if the user clicked on the graphical women icon 120a, FIGS. 5C, 5D and 5E may commence. The women icon 120a in the floating instructional box 110 is just a replicate of the women 120 in the page 100—representing women's business clothes. However, if the women 120 were dressed in ball gowns, prom or formal wear, it would be associated with the navigational link associated therewith. The "Steps" in the Categories section of the floating instruction box 10 allows the user to navigate to any sub category desired.

It should be noted the primary difference in FIGS. 5A and 5B is that the main page 100 is scrolling.

Referring now to FIGS. 5C, 5D and 5E, these figures represent the pages or part of pages 150a, 150b, 150c for navigating through the women's business apparel. The primary difference in these figures is that the pages are automatically scrolling thus the women's business apparel is "pushed" and presented to the user. The floating instruction box 110 remains essentially stationary. The user can select various elements in the displayed selection array to see additional information, or to buy something. The illustrations of FIGS. 5C, 5D and 5E illustrates that the website pages actively "push" the content to the viewer. In other words, the website actively navigates for the user and does not sit still waiting for the user's input before any navigation commences.

Figure 5F:
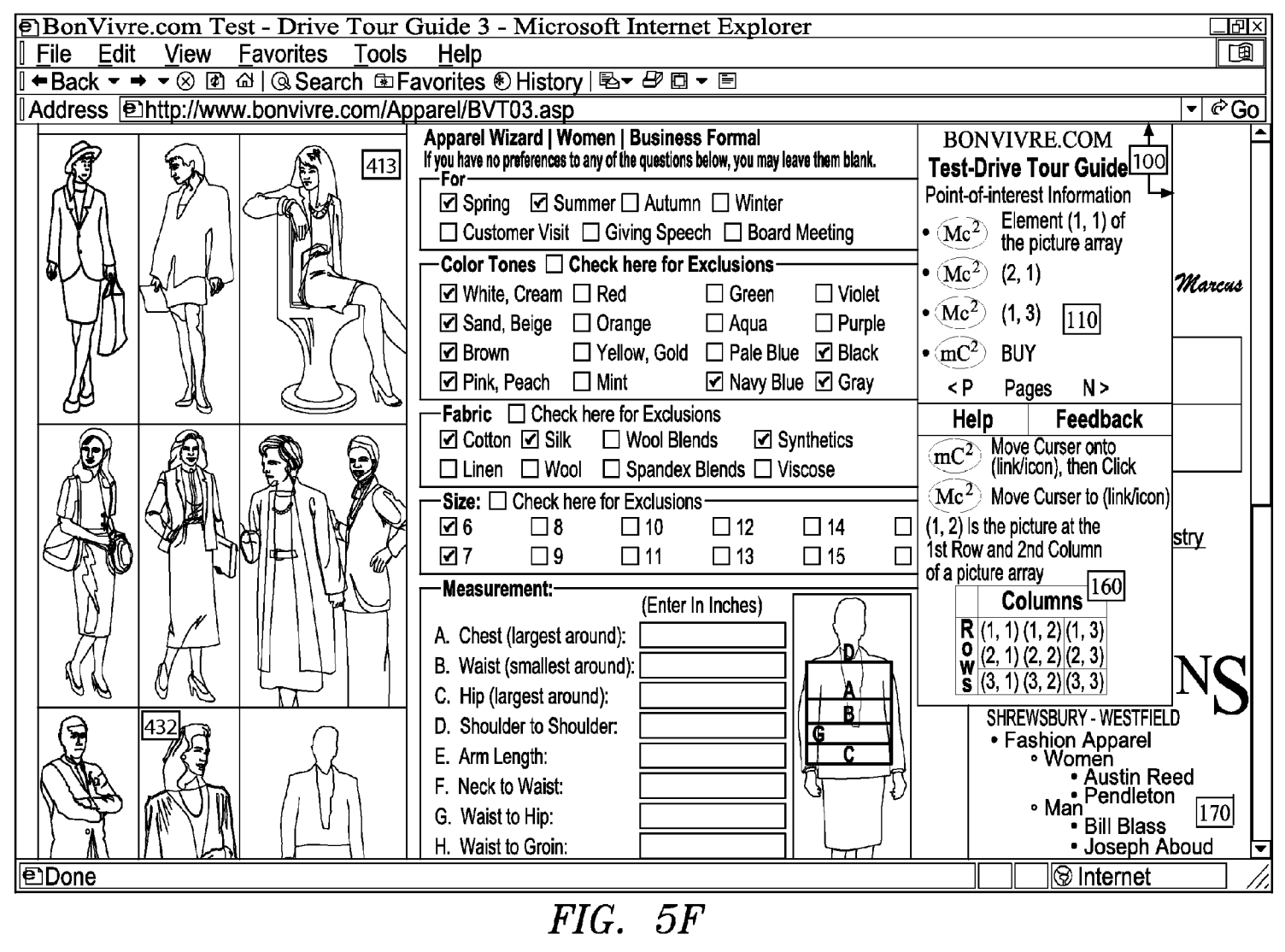
Figure 5G:
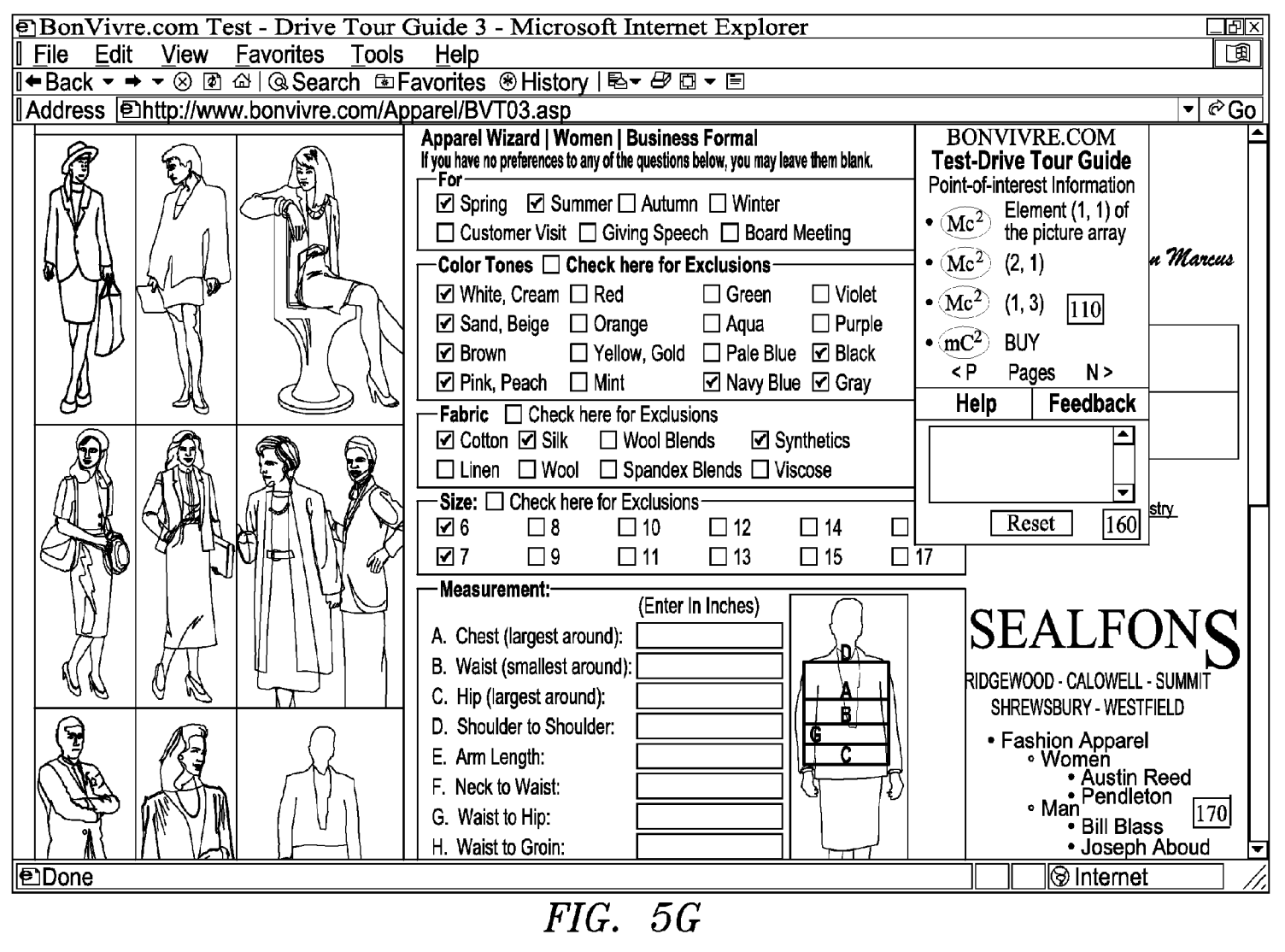

FIG. 5F illustrates the floating instruction box 110' when the help button 140 is clicked. The floating instruction box 110' includes a drop down dialog box 160 to explain the arrangement of the page.

FIGS. 5A-5F include a sub-window 170 that can be continuously scrolled automatically independently of the main window of the pages 100, 150a, 150b and 150c.

The present invention also provides a mechanism to make the otherwise passive browser/web media active and interactive, and TV/Video media interactive, enabling both media with pushing and pulling functions.

As can be appreciated, the present invention provides a method of automatically displaying and navigating through a media, whether TV/Video or Computer/Browser; and, automatically scrolling the content to push and allure navigation through the media.

The website exemplified in FIGS. 5A through 5F has multiple categories wherein each category has multiple sub-categories. The method provides for displaying a floating dynamic instruction box 110, 110' overlaid on the page that displays navigational links for alluring the user to further navigate to a category or to a sub-category.

The page 100 is a website home page. The page 100 includes at least one blinking picture or link. The method dynamically changes the floating dynamic instruction box 110, 110' in response the at least one blinking picture to entice the user to further navigate.

Accordingly, the method automates sequences of blinking links in a page; and activates the blinking links of the sequences to automatically and sequentially push navigation within the website. The sequences may be programmed based on a user's demographics or profile, or any other suitable criteria.

The pages 100, 150a, 150b and 150c include a sub-window 170. The sub-window 170 can be automatically scrolled independently of the main window of pages 100, 150a, 150b and 150c.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

The invention claimed is:

1. A computer implemented method of programming digital content to be displayed on an interactive display screen of an electronic display device to be viewed by a user, the interactive display screen is actionable by a user command, the method comprising:
   displaying a page of content on the interactive display screen, wherein the page comprises a designated area for displaying one or more of a plurality of sets of content wherein the space required to display the plurality of sets of content collectively is larger than the space available in the designated area at a given point in time;
   displaying, in the designated area, a first set of content of the plurality of sets of content for a first period of time; and
   automatically moving, into the designated area and replacing the first set of content, a second set of content of the plurality of sets of content for a second period of time, thus continually and automatically progressing to display a next set of content of the plurality of sets of content by replacing the immediate preceding set of content currently displayed in the designated area;
   wherein each set of content comprises at least one actionable link linking to additional actionable content related to an object represented in the respective set of content currently being displayed in the designated area; and
   displaying, upon activation of the at least one of the actionable links, the additional content related to the object by the display device, separately from the displaying of the each set of content in the designated area.

2. The method of claim 1, wherein the moving of the set of content displaying in the designated area comprises a directional scrolling mechanism.

3. The method of claim 1, wherein each set of content displayed in the designated display area comprises a set of pictorially represented objects; at least one of the pictorial representations of the objects is associated with the actionable link linking to additional content including at least one of information or the actionable link concerning the represented object.

4. The method of claim 3, wherein the additional content linked to a represented object in a displayed set of content comprises at least one actionable link for conducting an online activity related to the object.

5. The method of claim 4, wherein the online activity comprises an online commerce activity.

6. The method of claim 1, wherein the set of pictorially represented objects is a set of thumbnails of pictorial representations of objects.

7. The method of claim 1, wherein the automated state of moving of the set of content being displayed in the designated area is interrupted or changed in response to a user command; the method further comprising a user interaction mechanism set programmed for conveying at least one of the following user commands to the displaying of content sets in the display area:
pausing an ongoing automated moving of the displaying set of content,
resuming an automated changing of the displaying set of content after pausing,
changing the direction of automated scrolling when the changing is a visibly directional scrolling,
initiating an automated changing that is a visibly directional scrolling in a certain direction,
increasing the speed of the automated scrolling change,
decreasing the speed of automated scrolling change, or
initiating an automated scrolling change of the displaying set of content when the displaying is stationary.

8. The method of claim 7, wherein the user interaction mechanism set includes a set of actionable icons displaying in the designated display area, each icon symbolically signifying a command.

9. The method of claim 7, wherein the display device is a conductive touch sensitive display device, and
the user interaction mechanism set further comprises in conjunction with the conductive touch device, receiving input via a finger or an electronic pen touching the conductive touch sensitive display device,
in response to the received input, interpreting a specific user command, including at least one of the following commands:
initiate an automated visible scrolling change of displaying content in a certain direction,
changing the direction of the automated visible scrolling change,
increasing the speed of automated visible scrolling change,
decreasing the speed of automated scrolling,
pausing the automated scrolling, or
resuming the automated scrolling after pausing.

10. The method of claim 7, wherein the mechanism set further comprises, in response to a user activity, changes a displaying status, further comprising:
in response to the user activity received during a stationary period of the displaying a set of content, initiating the automated moving of the displaying set of content;
in response to the user activity received during an automated moving of the displaying a set of content, pausing the moving; and
in response to the user activity received during a pause, resuming the automated moving;
the set of actionable mechanisms are programmed to change an ongoing automated visible directional scrolling and at least one mechanism in the mechanism set that is present during a visible directional scrolling of the sets of content being displayed will result in one of the following change of displaying status:
stops scrolling,
initiate scrolling in the same direction,
speed up the scrolling in the same direction,
slow down scrolling in the same direction,
pausing scrolling, and
resume scrolling after pausing;
the displaying further comprising a directional mechanism opposite to a present scrolling direction will reverse the scrolling direction.

11. A system for interactively displaying digital content on an electronic display device, the system manipulating the digital content to display in a dynamic and user friendly manner, the system comprising at least one computing device comprising a non-transitory computer readable storage media further comprising executable instructions, further comprising:
at least one hardware processor coupled to the non-transitory computer readable storage media which executes the instructions and is configured to:
display a page of content on an interactive display screen of the device, wherein the page comprises a designated area for displaying one or more of a plurality of sets of content wherein the space required to display the plurality of sets of content collectively is larger than the space available in the designated area at a given point in time;
display, in the designated area, a first set of content of the plurality of sets of content for a first period of time; and
automatically moving, into the designated area and replacing the first set of content, a second set of content of the plurality of sets of content for a second period of time, thus continually and automatically progressing to display a next set of content of the plurality of sets of content by replacing the immediate preceding set of content currently displayed in the designated area;
wherein each set of content comprises at least one actionable link linking to additional actionable content related to an object represented in the respective set of content currently being displayed in the designated area; and
display, upon activation of the at least one of the actionable links, the additional content related to the object by the display device, separately from the displaying of the each set of content in the designated area.

12. The system of claim 11, wherein the moving of the set of content displaying in the designated area comprises a directional scrolling mechanism.

13. The system of claim 11, wherein each set of content displayed in the designated display area comprises a set of pictorially represented objects; at least one of the pictorial representations of the objects is associated with the actionable link linking to additional content including at least one of information or the actionable link concerning the represented object.

14. The system of claim 11, wherein the set of pictorially represented objects is a set of thumbnails of pictorial representations of objects.

15. The system of claim 13, wherein the additional content linked to a represented object in a displayed set of content comprises at least one actionable link for conducting an online activity related to the object.

16. The system of claim 15, wherein the online activity comprises an online commerce activity.

17. The system of claim 11, wherein the automated state of moving of the set of content being displayed in the designated area is interrupted or changed in response to a user command; the method further comprising a user interaction mechanism set programmed for conveying at least one of the following user commands to the displaying of content sets in the display area:
pausing an ongoing automated moving of the displaying set of content,
resuming an automated changing of the displaying set of content after pausing,
changing the direction of automated scrolling when the changing is a visibly directional scrolling,
initiating an automated changing that is a visibly directional scrolling in a certain direction, increasing the speed of the automated scrolling change, decreasing the speed of automated scrolling change, or initiating an automated scrolling change of the displaying set of content when the displaying is stationary.

18. The system of claim 17, wherein the user interaction mechanism set includes a set of actionable icons displaying in the designated display area, each icon symbolically signifying a command.

19. The system of claim 17, wherein the display device is a conductive touch sensitive display device, and
the user interaction mechanism set further comprises in conjunction with the conductive touch device, receiving input via a finger or an electronic pen touching the conductive touch sensitive display device,
in response to the received input, interpreting a specific user command, including at least one of the following commands:
initiate an automated visible scrolling change of displaying content in a certain direction,
changing the direction of the automated visible scrolling change,
increasing the speed of automated visible scrolling change,
decreasing the speed of automated scrolling,
pausing the automated scrolling, or
resuming the automated scrolling after pausing.

20. The system of claim 17, wherein the mechanism set further comprises, in response to a user activity, changes a displaying status, further comprising:
in response to the user activity received during a stationary period of the displaying a set of content, initiating the automated moving of the displaying set of content;
in response to the user activity received during an automated moving of the displaying a set of content, pausing the moving; and
in response to the user activity received during a pause, resuming the automated moving;
the set of actionable mechanisms are programmed to change an ongoing automated visible directional scrolling and at least one mechanism in the mechanism set that is present during a visible directional scrolling of the sets of content being displayed will result in one of the following change of displaying status:
stops scrolling,
initiate scrolling in the same direction,
speed up the scrolling in the same direction,
slow down scrolling in the same direction,
pausing scrolling, and
resume scrolling after pausing;
the displaying further comprising a directional mechanism opposite to a present scrolling direction will reverse the scrolling direction.

21. A method for displaying and instructing the browsing of and interacting with complex digital content on an electronic display, the method comprising:
automatically scrolling primary content on a primary display screen at a desired speed and direction; and
suspending a small boxed stationary display area over the scrolling primary content on the primary display screen;
wherein the small boxed stationary display area displays relevant instructions for user action related to the primary content;
the automated scrolling further comprises, in response to a user interaction with the small boxed stationary display area:
suspending, re-initiating, or altering the speed of the automated scrolling.

22. The method claim 21, wherein the user action instructions displayed in the small boxed display area further comprises a mechanism set for user interaction, comprising a mechanism for advancing a level of instruction, advancing a level of user action, repeating previous instructions, or page to next instructions.

23. The method of claim 21, wherein the primary content is an instructional manual, and the user action instructions displayed in the small box display area are practice actions for the user to make in relation with the displayed portions of the manual.

24. A system for displaying a complex user interactive content that instructs user to make a set of user actions relevant to the portion of primary content being displayed, the system comprising at least one computing device comprising a non-transitory computer readable storage media further comprising executable instructions, further comprising:
at least one hardware processor coupled to the non-transitory computer readable storage media which executes the instructions and implements:
automatically scrolling primary content on a primary display screen at a desired speed and direction; and
suspending a small boxed stationary display area over the scrolling primary content on the primary display screen;
wherein the small boxed stationary display area displays relevant instructions for user action related to the primary content;
the automated scrolling further comprises, in response to a user interaction with the small boxed stationary display area:
suspending, re-initiating, or altering the speed of the automated scrolling.

25. The system of claim 24, wherein the user action instructions displayed in the small boxed display area further comprises a mechanism set for user interaction, comprising a mechanism for advancing a level of instruction, advancing a level of user action, repeating previous instructions, or page to next instructions.

26. The system of claim 24, wherein the primary content is an instructional manual, and the user action instructions displayed in the small box display area are practice actions for the user to make in relation with the displayed portions of the manual.

* * * * *